United States Patent [19]

Ohba et al.

[11] Patent Number: 4,483,965
[45] Date of Patent: Nov. 20, 1984

[54] STRETCHED FILM

[75] Inventors: Yozo Ohba; Takashi Toyoda; Masaaki Yamanaka, all of Ibaraki; Fukashi Hashimoto; Tetsuji Kakizaki, both of Mie, all of Japan

[73] Assignees: Mitsubishi Petrochemical Co., Ltd.; Oji Yuka Goseishi Co., Ltd., both of Tokyo, Japan

[21] Appl. No.: 484,337

[22] Filed: Apr. 12, 1983

Related U.S. Application Data

[63] Continuation of Ser. No. 195,687, Oct. 9, 1980, abandoned.

[30] Foreign Application Priority Data

Oct. 9, 1979 [JP] Japan ................................ 54-130436

[51] Int. Cl.$^3$ ........................................... C08F 255/02
[52] U.S. Cl. .................. 525/322; 264/288.4; 264/290.2; 264/289.3; 525/324
[58] Field of Search ............... 525/316, 319, 320, 322, 525/324; 264/288.4, 290.2, 289.3

[56] References Cited

U.S. PATENT DOCUMENTS

| | | | |
|---|---|---|---|
| 3,652,730 | 3/1972 | Favie | 525/322 |
| 3,869,533 | 3/1975 | Janocha | 264/146 |
| 4,097,554 | 6/1978 | Yui | 260/878 R |
| 4,134,957 | 1/1979 | Yoshimura | 264/288 |

Primary Examiner—Paul R. Michl
Attorney, Agent, or Firm—Sughrue, Mion, Zinn, Macpeak & Seas

[57] ABSTRACT

A stretched film having excellent printing and writing properties and mechanical strength is produced by stretching a film molded from a styrene-grafted polyolefin resin in at least one direction. The styrene-grafted polyolefin resin is produced by heating an aqueous suspension containing 100 parts by weight of polyolefin resin particles, from 10 to 400 parts by weight of a styrene monomer, and a free radical polymerization initiator in an amount of from 0.01 to 1 part by weight per 100 parts by weight of the styrene monomer.

13 Claims, No Drawings

STRETCHED FILM

This is a continuation of application Ser. No. 195,687, filed Oct. 9, 1980 abandoned.

BACKGROUND OF THE INVENTION

1. Field of the Invention

This invention relates to stretched films free from the problem of paper powder, and having excellent printing and writing properties and excellent strength.

2. Description of the Prior Art

It has heretofore been known that an opaque paper having writing and printing properties can be produced by compounding a polyolefin resin or a mixture of a polyolefin resin and a polystyrene resin with an inorganic fine powder, processing the resulting mixture to form a film, and then stretching the film in at least one direction (see Japanese Patent Publication Nos. 40794/1971, 3902/1972 and 9229/1979, U.S. Pat. No. 3,154,461, and British Pat. Nos. 1,096,064 and 1,090,059).

In such methods, however, inorganic powders such as calcium carbonate, clay, diatomaceous earth, titanium oxide, etc. are used to provide printing properties, and these inorganic powders give rise to various printing problems. For example, inorganic fillers or powders projecting from the surface of the stretched film fall off and mix with an offset printing ink, deteriorating the ink, shortening the durability of the ink and wearing away an aluminum plate (this is the so-called "paper powder" problem), and they stick together to form big particles on which no gravure printing ink can be printed, leading to the occurrence of the phenomenon "whiteness" (i.e., the fillers on which the printing ink is adhered separate from the stretched film and the omitted portions become white).

Moreover, since such inorganic fine powders act to lower the transparency of film, if the amount of the inorganic fine powder added is reduced to obtain translucent synthetic papers such as tracing paper, paper for a poster to be used on an electric sign, etc., offset printing and writing properties will be reduced. Therefore, it is difficult to obtain synthetic papers having a good balance between transparency and writing or offset printing properties.

These tendencies are more marked when a mixture of polyolefin and polystyrene is used as the film.

Furthermore, since a transparent stretched polypropylene film is poor in affinity to printing ink for cellulose based films in which a cellulose based resin is used as a binder (even when a corona discharge treatment is applied onto the surface of the polypropylene film), the printing ink used for propropylene sheets or films is a special ink prepared by using a polyamide-based or polyvinyl chloride-based resin as a binder and diluting the binder with a solvent composed mainly of toluene; such ink low drying properties.

The toluene solvent, however, hardly dissipates from the binder and polypropylene film. Therefore, a long period of time is required for drying after printing. Furthermore, the film is typically not sufficiently dried, and the solvent odor remains in the film, preventing the polypropylene film from applications in the field of food wrapping.

In order to permit the gravure printing of the polypropylene film by use of the ink for cellulose based films, it has been considered necessary to use a mixture of polypropylene and polystyrene. However, a film produced from such a mixture is translucent or opaque, and a transparent wrapping film has not been obtained using such a mixture.

SUMMARY OF THE INVENTION

It has now been found according to this invention that a synthetic paper having excellent printing and writing properties can be obtained without using inorganic fine powders, and that by adjusting the stretching temperature, various kinds of films, from films having excellent transparency to translucent and opaque films, can be obtained.

This invention, therefore, provides a stretched film which is obtained from a film molded from a styrene-grafted polyolefin resin by stretching the film in at least one direction, said styrene-grafted polyolefin being produced by heating an aqueous suspension containing 100 parts by weight of polyolefin resin particles, from 10 to 400 parts by weight of a styrene monomer, and a free radical polymerization initiator in the amount of from 0.01 to 1 part by weight per 100 parts by weight of the styrene monomer.

DETAILED DESCRIPTION OF THE INVENTION

In producing the present styrene-grafted polyolefin resin, other vinyl monomers, such as methyl methacrylate, acrylonitrile, etc. can be used in combination with the styrene monomer.

As polyolefin resin powders onto which the styrene can be grafted according to this invention, homopolymers of olefins containing from 2 to 4 carbon atoms, copolymers of two or more of such olefins, an ethylene-vinyl acetate copolymer, etc. can be used. In view of the strength, polyethylene and polypropylene resin particles having a density of 0.915 to 0.970 g/cm$^3$ are preferred.

The amount of the styrene monomer compounded is from 10 to 400 parts by weight, and preferably from 50 to 150 parts by weight, per 100 parts by weight of the polyolefin resin particles.

Free radical polymerization initiators which can be used in this invention include cyclohexanone peroxide, t-butylperoxy benzoate, methyl ethyl ketone peroxide, dicumyl peroxide, di-t-butyl peroxide, 2,5-dimethyl-2,5-dibenzoylperoxy hexane, di-t-butyl-di-peroxy phthalate, etc.

The polymerization temperature is typically from 80° C. to 150° C., and preferably from 100° C. to 130° C. If the temperature is lower than 80° C., the polymerization time is too long, and on the other hand, if the temperature is higher than 150° C., the sytrene-grafted polyolefin resin has a high degree of cross-linking and, as a result, has a poor extrusion-workability.

A process for the production of these styrene-grafted polyolefin resin particles is described in Japanese Patent Application (OPI) Nos. 5473/1974, 127965/1975, 32990/1977 (corresponding to U.S. Pat. No. 4,097,554 and British Pat. No. 1,498,346), 50389/1977, 50390/1977, etc. Therefore, more detailed descriptions are omitted.

It appears that the thus-obtained styrene-grafted polyolefin resin is not similar to the starting material, polyolefin resin, and it is a composite resin containing a polyolefin resin with polystyrene fine particles uniformly dispersed therein, a graft polymer in which styrene monomers are graft-polymerized onto the stem of the polyolefin resin and/or a graft polymer in which styrene polymers are grafted onto the surface of the polyolefin resin particles. In general, it appears that according to the method of this invention, the proportion of grafted styrenes present as sytrene-grafted polyolefin and polystyrene-grafted polyolefin constitutes from 15% to 30% by weight of the total styrenes, and the remainder is converted into styrene homopolymers finely dispersed in the inside of polyolefin particles.

Unmodified polyolefins and polystyrenes can be added to the styrene-grafted polyolefin resin thus produced if desired. Moreover, depending on the capacity required for the synthetic paper, thermoplastic resins such as polyamides, polyethylene terephthalate, etc., rubber substances such as ethylene-propylene copolymer rubbers, styrene-butadiene copolymer rubbers, etc., inorganic powders such as calcium carbonate, clay, titanium oxide, etc., auxiliary agents such as stabilizers, antioxidants, ultraviolet ray-absorbing agents, surface active agents, dispersants, lubricants, etc., and so forth may be compounded therewith.

The thus-obtained composition is melt with an extruder and formed into a film with a flat die or a circular die, and the film is stretched in at least one direction.

As a technique for stretching, a mandrel method, a method utilizing the difference in circumferential speeds of rolls, a tenter method, an internal pressure method, or combinations thereof can be used. The film is stretched in at least one direction to at least 1.5 times, and preferably from 4 to 12 times, its original length. In the case of biaxial stretching, it is stretched in such a manner that the area is from 3 to 96 times, and preferably from 20 to 60 times, its original area.

In more detail, where the film is stretched, e.g., in a longitudinal direction by use of rolls and then in a transverse direction by use of a tenter, the preferred stretch ratios in the longitudinal and transverse directions are respectively from 3.5 to 6 and from 5 to 9.

The stretching is carried out at a temmperature lower than the melting point of the styrene-grafted polyolefin resin, i.e., at a temperature at which the stretched resin shows orientation. However, since the styrene-grafted polyolefin resin is, as described hereinbefore, a mixed resin, and shows two or three or more peaks in the differential thermal analysis, the stretching is carried out at a temperature lower than the melting point of the polyolefin resin onto which the styrene monomer is to be grafted, preferably at a temperature lower by at least 5° C. than the melting point. For example, in the case of a styrene-grafted polypropylene, the stretching temperature is 163° C. or less, and in the case of a styrene-grafted intermediate or low density, or high density polyethylene, 133° C. or less.

The stretching temperature and the stretch ratio exert great influences on the transparency or opaqueness of the synthetic paper obtained. It is known that in the case of a film produced from a mixture of mutually unsoluble resins, in general, the higher the stretch ratio and the lower the stretching temperature, the higher is the opaqueness of the obtained film. See, for example, U.S. Pat. No. 3,154,461.

Surprisingly, however, in the case of the styrene-grafted polyolefin according to this invention, it has been found that the lower the stretching temperature and the higher the stretch ratio, the higher is the transparency of the film obtained. Therefore, in order to obtain transparent films having a BEKK index of 2,000 to 20,000 seconds as measured by JIS P-8119 (1976), the stretching temperature of the styrene-grafted polypropylene resin is desirably from 135° C. to 155° C., and preferably from 140° C. to 150° C. and that of the styrene-grafted intermediate or low density or high density polyethylene resin, from 105° C. to 125° C., and preferably from 110° C. to 120° C., although these values may vary according to the stretch ratio, stretching speed, graft ratio of styrene, etc.

This stretched film generally contains no pore in the interior thereof and no cracks on the surface thereof.

On the other hand, when translucent or opaque films having a BEKK index of 3,000 seconds or less are desired, the stretching temperature of the former resin is generally from 145° C. to 163° C., and preferably from 150° C. to 160° C., and the stretching temperature of the latter resin is generally from 118° C. to 133° C., and preferably from 120° C. to 130° C.

This stretched film generally contains fine pores in the interior thereof, but no cracks on the surface thereof. A quantity of the fine pore is defined by the porosity.

$$\text{Porosity (\%)} = \frac{\rho_o - \rho}{\rho_o} \times 100$$

wherein $\rho_o$ is a specific gravity of the film before stretching and $\rho$ is an apparent specific gravity of the film after stretching. The porosity is generally between 3 and 40%.

In the method of this invention, the styrene-grafted polyolefin is stretched in at least one direction (i.e. monoaxially), but may also be stretched biaxially. Although a monoaxially stretched product is preferred in that it is excellent in offset printing properties, when it is used as a single layer, it is subject to longitudinal or transverse splitting, and therefore is limited in its practical usefulness as a synthetic paper. It is, therefore, preferred to form a laminated product having a structure wherein a biaxially stretched film is bonded to a paper-like layer of the monoaxially stretched product.

Another embodiment of this invention is a composite stretched film having excellent low temperature heat sealability which is prepared by laminating a styrene-grafted polyolefin resin layer on at least one surface of a base layer made of a resin having the same melting point as the polyolefin prior to modification with the styrene, or a melting point of 15° C. or more higher than that of the styrene-grafted polyolefin to form a laminated product and by stretching the laminated product at a temperature which is lower than the melting point of the resin constituting the base layer and which is the melting point of the styrene-grafted polyolefin resin or exceeds the melting point.

The base layer is a biaxially stretched film, has a porosity of 0 to 50%, and can contain up to 68wt% of fillers.

While the styrene-grafted polyolefin layer constituting the surface of the composite stretched film is stretched, it is not materially oriented and, therefore, no deformation due to the residual stain occurs during the heat sealing.

Depending on the purpose, the low-temperature sealable composite film can be made transparent, translucent, or opaque by suitably selecting the stretching temperature, stretching ratio and materials of the layers, as described above. The optimum materials for the composite film are as follows: the resin constituting the base layer is polypropylene, and the polyolefin of the styrene-grafted polyolefin constituting the surface layer is polyethylene having a density of from 0.915 to 0.970 g/cm$^3$, a propylene copolymer having a melting point lower by 15° C. or more than that of the polypropylene constituting the base layer (e.g., a copolymer of propylene and ethylene or olefin such as butene-1, hexene-1, methylpentene-1, etc.), or an ethylene copolymer (e.g., a copolymer of ethylene and acrylic acid, vinyl acetate, acrylate, methacrylate or the like).

Another embodiment of the invention is an opaque stretched film having cracks (10 or more per square millimeter) in the surface thereof and a number of fine pores (porosity 10–65%) in the interior thereof, which is produced by molding a composition consisting of 100 parts by weight of a styrene-grafted polyolefin and from 3 to 200 parts, preferably 3 to 20 parts, by weight of inorganic fine powder to form a film and stretching the film at a lower temperature than the melting point of the styrene-grafted polyolefin.

The organic fine powder (filler) is added to further improve the opaqueness, offset printing and writing properties of the stretched film obtained. Addition of the filler is undesirable from the viewpoint of paper powder problem, but addition of the filler in an amount of from 3 to 20 parts by weight does not greatly affect the paper powder problem.

The film of this invention has the advantage that it can be printed by gravure printing for cellulose films as well as by gravure printing for polyolefins. Moreover, in comparison with conventional synthetic papers, in which inorganic fine powders are compounded therein, the film of this invention suffers less from the disadvantage of paper powder and is free from the problem of "whiteness", and thus it has excellent printing properties in offset printing, gravure printing, etc. In addition, the translucent or opaque film of this invention having a BEKK index of 3,000 seconds or less, which indicates the degree of smoothness of the surface, is good in writing properties with a pencil.

Of the stretched films according to this invention, the transparent stretched film is useful as a wrapping film; The translucent stretched film is useful, as tracing paper, a poster for an electric sign, a wrapping film, a film for print lamination, or the like; and the opaque stretched film is useful, as artpaper, photographic paper, wrapping paper, paper for an envelope, makeup paper, paper for a note, paper for a map, and so forth.

The opaque film having a number of fine pores in the interior thereof is particularly useful as a pseudo-leather, makeup paper for construction materials, paper for forming a bag, etc.

The following examples are given to illustrate this invention in greater detail. All parts are by weight.

PREPARATION EXAMPLE 1

Preparation of Styrene-grafted Polypropylene 1,400 g of pure water and 14 g of polyvinyl alcohol, as a dispersing agent to form an aqueous medium, were placed in a 3 liter-autoclave. In this aqueous medium, 490 g of homopolypropylene (Mitsubishi Noblen MA-6, trademark for a product of Mitsubishi Petrochemical Co., Ltd.) particles having a mean particle diameter of 2 to 3 mm was suspended. Separately, 1.1 g of t-butyl-peroxy benzoate as a polymerization initiator was dissolved in 510 g of styrene (in the amount of 105 parts per 100 parts of polypropylene) and added to the above prepared suspension. By raising the temperature in the autoclave to 90° C. and maintaining it at that temperature for 3 hours, the polypropylene resin particles were saturated with the styrene containing the free radical polymerization initiator.

The aqueous suspension was then raised in temperature to 105° C., and maintained at that temperature for 2 hours to carry out polymerization, and then it was further raised in temperature to 120° C., and maintained at that temperature for 5 hours, to complete the polymerization.

After cooling, the product was removed from the autoclave and washed with water to obtain 1,000 g of styrene-modified polypropylene particles, having a mean particle diameter of 3 to 4 mm.

PREPARATION EXAMPLE 2

Preparation of Styrene-grafted Polyethylene

In a 3 liter-autoclave were placed 1,400 g of pure water and 14 g of polyvinyl alcohol as a dispersing agent to form an aqueous medium. In this aqueous medium, 700 g of high density polyethylene (Yukalon Hard EY-40, trademark for a product of Mitsubishi Petrochemical Co.; density; 0.960) particles were suspended by stirring. Separately, 0.50 g of t-butylperoxy benzoate was dissolved in 300 g of styrene (in the amount of 43 parts per 100 parts of polyethylene) and added to the above prepared suspension. By raising the temperature in the autoclave to 90° C. and maintaining it at that temperature for 4 hours, the high density polyethylene particles were saturated with the styrene containing the polymerization initiator.

This aqueous suspension was raised in temperature to 105° C. and maintained at that temperature for 2 hours to effect polymerization, and then it was further raised in temperature to 120° C., and maintained at that temperature for 5 hours, to complete the polymerization.

After cooling, the product was removed and washed with water to obtain 1,000 g of styrene-modified high density polyethylene particles having a means particle diameter of 3 to 4 mm.

EXAMPLE 1

A composition consisting of 90 parts of polypropylene (Mitsubishi Noblen MA-6, trade name for a product of Mitsubishi Petrochemical Co., Ltd.; m.p.: 164° C.), 10 parts of high density polyethylene (Yukalon Hard EY-40, trade name for a product of Mitsubishi Petrochemical Co., Ltd.; m.p.: 130° C.) and 10 parts of calcined clay was molten-kneaded in an extruder, extruded through a die at a temperature of 250° C., and cooled down to about 50° C. Thereafter, the sheet so obtained was again heated up to about 140° C. and stretched in a longitudinal direction to 5 times the original length by utilizing the difference in circumferential speeds of rolls to obtain a base layer.

The styrene-grafted polypropylene particles as obtained in Preparation Example 1 were melt in another extruder, extruded in a sheet form from a die at a temperature of about 250° C., and laminated on both sides of the above obtained base layer. The thus-obtained laminate was cooled down to 80° C., then preheated up to about 158° C., stretched in a transverse direction to 9 times the original length at a sheet temperature by use of a tenter, passed through an oven maintained at 155° C. for 15 seconds, cooled down to room temperature and subjected to a corona discharge treatment (100 w/m$^2$.min), to thereby obtain an opaque synthetic paper having a three-layer construction comprising a base layer having a thickness of 60μ and surface layers on both sides of the base layer, each having a thickness of 25μ.

EXAMPLE 2

A synthetic paper of the three-layer construction was produced in the same manner as in Example 1, with the exception that a composition having the following formulation was used as the composition for forming the surface layers.

|  | Amounts (parts) |
| --- | --- |
| Styrene-grafted polypropylene as obtained in Preparation Example 1 | 80 |
| Mitsubishi Noblen MA-6 | 11.5 |
| Diatomaceous Earth | 0.6 |
| Calcined Clay | 7.9 |

EXAMPLE 3

A synthetic paper of the three-layer construction was produced in the same manner as in Example 1, with the exception that the styrene-grafted polyethylene as obtained in Preparation Example 2 was used in place of the styrene-grafted polypropylene to form the surface layers, the extrusion and stretching temperatures were, respectively, 220° C. and 128° C., and after the transverse stretching, the laminate was passed through an oven maintained at 140° C.

COMPARATIVE EXAMPLE 1

In the same manner as in Example 1, with the exception that a composition having the formulation as shown below was used as a composition for forming the surface layers, an opaque synthetic paper of three-layer construction was obtained in which the surface layers and the base layer all contained fine pores therein.

|  | Amount (parts) |
| --- | --- |
| Mitsubishi Noblen MA-6 | 54 |
| Mitsubishi Hard EY-40 | 3.5 |
| Calcined Clay | 37 |
| Titanium Oxide | 5.5 |

The opaque synthetic papers obtained in Examples 1 to 3 and Comparative Example 1 was evaluated by the following methods:

Smoothness (BEKK Index): Measured according to JIS P-8119 (1976).

Printing Properties:
 (1) Continuous printing properties:
  Number of printed films until the nonuniformity in transfer of an ink onto the film occurs owing to the paper powder when continuously printing by use of an offset printer produced by Mitsubishi Heavy Industry Co., Ltd. (trade name: Dia II-2), an ink produced by Toka Shikiso Kagaku Kogyo (trademark: SGX-108), and a plate (P/S plate, Himayalan chart; width 470 mm, length 636 mm).
 (2) Adhesion of Ink:
  An adhesive tape produced by Nichiban Co. (trademark: Cellotape) was adhered on the 100th printed film, and stripped off at an angle of 90°. No stripping of the surface indicated good adhesion, while stripping of the surface indicated poor adhesion.

Opaqueness: Measured according to JIS P-8138 (1976).

Luster: Measured according to JIS P-8142 (1965).
Brightness: Measured according to JIS L-1074 (1977).
Writing Properties: If it is possible to write with a pencil (HB grade, produced by Mitsubishi Pencil Co., Ltd.), the writing properties are good ( ), and when it is not possible, the writing properties are poor (x).
The results are shown in Table 1.

TABLE 1

|  | Example | | | Comparative Example 1 |
| --- | --- | --- | --- | --- |
|  | 1 | 2 | 3 |  |
| Smoothness (sec) | 60 | 180 | 70 | 700 |
| Opaqueness (%) | 94 | 95.3 | 93.8 | 93.0 |
| Printing Properties |  |  |  |  |
| (1) Continuous printing properties | 10,000 | 8,000 | 10,000 | 1,000 |
| (2) Adhesion of ink | good | good | good | poor |
| Writing Properties | O | O | O | O |
| Luster | 8.4 | 7.7 | 8.2 | 16.4 |
| Brightness | 92.1 | 93.9 | 92.9 | 92.9 |

EXAMPLES 4 TO 8

| Styrene-grafted polypropylene as obtained in Preparation Example 1 | 90 parts |
| --- | --- |
| Mitsubishi Noblen MA-6 | 10 parts |

These ingredients were melt in an extruder and extruded therefrom in a sheet form at a temperature of 250° C. After being cooled down to about 50° C., individual sheets were again heated up to the temperatures shown in Table 2, biaxially stretched at the same temperature so that the stretched area ratio was 50, and further subjected to a corona discharge treatment (100 w/m².min) to obtain transparent (opaqueness of 10% or less), translucent (opaqueness of more than 10% to 37%) and opaque (opaqueness of 38% or more) stretched films of the single structure.

With these stretched films, the smoothness, opaqueness, writing properties and printing properties using a printing ink for cellulose films were measured, and the results are shown in Table 2.

TABLE 2

|  | Example | | | | |
| --- | --- | --- | --- | --- | --- |
|  | 4 | 5 | 6 | 7 | 8 |
| Stretching Temp. (°C.) | 160 | 150 | 140 | 130 | 120 |
| Smoothness (sec) | 195 | 510 | 3,100 | 7,000 | 10,000 |
| Opaqueness (%) | 28 | 21 | 12 | 6 | 3 |
| Writing Properties | O | O | O | x | x |
| (Printing Properties*) | good | good | good | good | good |

*Printing properties were determined as follows:

A printing ink for cellulose films, #CCST (trademark for a product of Toyo Ink Manufacturing Co., Ltd.) was coated on the surface of the stretched film, subjected to the corona discharge treatment, and dried at 60° C. for 1 minute. A 15 mm wide and 200 mm long test piece was cut from the stretched film. An adhesive tape (Cellotape) was attached on the printed surface of the test piece and stripped at an angle of 90°. When 90% or more of the print remains on the film, the printing properties are termed good.

EXAMPLES 9 TO 12

In the same manner as in Example 5 except that styrene-grafted polypropylenes obtained by suspension-polymerization of a styrene monomer (SM) and polypropylene particles (PN) in the ratios as shown in Table 3 were used as a material for forming a film, biaxially stretched films of the single layer structure were produced.

With the thus-obtained films, the smoothness, opaqueness, writing properties, and printing properties using a printing ink for cellulose films were measured, and the results are shown in Table 3.

TABLE 3

|  | Example | | | |
| --- | --- | --- | --- | --- |
|  | 9 | 10 | 11 | 12 |
| PN/SM | 100/50 | 100/105 | 100/150 | 100/200 |
| Smoothness (sec) | 700 | 510 | 1,000 | 2,000 |
| Opaqueness (%) | 18 | 21 | 15 | 12 |
| Writing Properties | O | O | O | O |
| Printing Properties | good | good | good | good |

In the above examples, a microscopic examination confirmed that the synthetic papers obtained in Examples 1, 3, and 4 to 12 contained no fine pores in the interior of the paper-like layer, whereas the synthetic papers obtained in Example 2 and Comparative Example 1 contained a number of fine pores in the interior of the paper-like layer.

EXAMPLE 13

In the same manner as in Preparation Example 1, except that ethylene-propylene random copolymer particles (Mitsubishi Noblen FX 4 produced by Mitsubishi Petrochemical Co., Ltd.; ethylene content: 4.3%; m.p.: 136° C.) were used in place of the homopolypropylene, a styrene-grafted polypropylene copolymer (styrene content: 50%) was obtained. This styrene-grafted polypropylene copolymer and polypropylene homopolymer (Mitsubishi Noblen FL 6C, produced by Mitsubishi Petrochemical Co., Ltd.; m.p.: 164° C.) were coextruded at 240° C. by use of a two layer coextrusion die to obtain a laminated sheet.

This laminated sheet was stretched at 138° C. in a longitudinal direction to 5 times the original length by use of rolls and then at 145° C. in a transverse direction to 10 times the original length by use of a tenter to obtain a two layer film. The thicknesses of the styrene-grafted copolymer layer and homopolymer layer were, respectively, 2μ and 16μ.

The homopolymer layer of this film had a luster (gloss value: 120) as much as that of a transparent biaxially stretched polypropylene for wrapping, and the grafted copolymer layer had a gloss value of 15% and BEKK Index of 500 sec.

This grafted copolymer layer was good in writing and printing properties, and was substantially unoriented.

The laminated film according to the invention is most suitable as a wrapping film for low temperature heat-sealing.

While the invention has been described in detail and with reference to specific embodiments thereof, it will be apparent to one skilled in the art that various changes and modifications can be made therein without departing from the spirit and scope thereof.

What is claimed is:

1. A stretched film having good writing and printing properties obtained from a film molded from a styrene-grafted polyolefin resin, by stretching the film in at least one direction, said styrene-grafted polyolefin being produced by heating an aqueous suspension containing 100 parts by weight of polyolefin resin particles, wherein the polyolefin resin is selected from polypropylene and polyethylene having a density of from 0.915 to 0.970 g/cm$^2$, 10 to 400 parts by weight of a styrene monomer and a radical polymerization initiator in an amount of from 0.01 to 1 part by weight per 100 parts by weight of the styrene monomer, wherein the stretched film has a BEKK index of 3,000 seconds or less as measured according to JIS-8119 (1976) and is translucent or opaque, the stretching temperature being 145° C. to 163° C. when the polyolefin resin particles are said polypropylene and the stretching temperature being 118° C. to 133° C. when said polyolefin resin particles are said polyethylene, wherein the proportion of styrene-grafted polyolefin in the styrene-grafted polyolefin resin is from 15 to 30% by weight and wherein the surface of the stretched film has no cracks and the interior of the stretched film is free of fine voids, said stretched film being free of inorganic fine powders.

2. A stretched film having good writing and printing properties and having more than 10/mm$^2$ cracks in the surface thereof and fine pores in the interior thereof providing a porosity of 20–65% which is obtained by stretching a film molded from a composition consisting of 100 parts by weight of a styrene-grafted polyolefin resin and from 3 to 200 parts by weight of inorganic fine powder, said styrene-grafted polyolefin resin being produced by heating an aqueous suspension containing 100 parts by weight of polyolefin resin particles, wherein the polyolefin resin is selected from polypropylene and polyethylene having a density of from 0.915 to 0.970 g/cm$^2$, 10 to 400 parts by weight of styrene monomer and a radical polymerization initiator in the amount of from 0.01 to 1 part by weight per 100 parts by weight of the styrene monomer, in at least one direction at a temperature lower than the melting point of the styrene-grafted polyolefin resin, wherein the stretched film has a BEKK index of 3,000 seconds or less as measured according to JIS P-8119 (1976) and is translucent or opaque, the stretching temperature being 145° C. to 163° C. when said polyolefin resin particles are said polypropylene and being 118° C. to 133° C. when said polyolefin particles are said polyethylene.

3. A stretched film as in claim 1 or 2 wherein the styrene monomer is present in an amount of from 50 to 150 parts by weight.

4. A stretched film as in claim 1 or 2 wherein the sheet or film is stretched in one direction to at least 1.5 times its original length.

5. A stretched film as in claim 1 or 2 wherein the sheet or film is stretched from 4 to 12 times its original length.

6. A stretched film as in claim 1 or 2 wherein the sheet or film is biaxially stretched such that its area is from 3 to 96 times its original area.

7. A stretched film as in claim 6 wherein the sheet or film is biaxially stretched such that its area is from 20 to 60 times its original area.

8. A stretched film as in claim 1 or 2 wherein the sheet or film is stretched from 3.5 to 6 times its original length in a longitudinal direction by use of rolls, and then stretched from 5 to 9 times its original dimension in the transversed direction by use of tenter.

9. A stretched film as in claim 2 wherein the polyolefin resin is polyethylene.

10. A stretched film as in claim 1, wherein the polyolefin resin particles are said polypropylene and the stretching temperature is 145° C. to 163° C.

11. A stretched film as in claim 2, wherein the polyolefin resin particles are said polypropylene and the stretching temperature is 145° C. to 163° C.

12. A stretched film as in claim 1, wherein the polyolefin resin particles are said polyethylene and the stretching temperature is 120° C. to 130° C.

13. A stretched film as in claim 2, wherein the polyolefin resin particles are said polyethylene and the stretching temperature is 120° C. to 130° C.

* * * * *